(12) United States Patent
Soby et al.

(10) Patent No.: US 12,476,983 B2
(45) Date of Patent: Nov. 18, 2025

(54) DETECTION OF UNKNOWN APPLICATIONS

(71) Applicant: AppOmni, Inc., San Francisco, CA (US)

(72) Inventors: Brian Soby, Carbondale, CO (US); Timothy Bach, Emeryville, CA (US); Michael Brancato, Lexington, KY (US); Drew Gatchell, Berryville, VA (US); Jason Tesarz, Templeton, CA (US)

(73) Assignee: AppOmni, Inc., San Francisco, CA (US)

( * ) Notice: Subject to any disclaimer, the term of this patent is extended or adjusted under 35 U.S.C. 154(b) by 33 days.

(21) Appl. No.: 17/903,663

(22) Filed: Sep. 6, 2022

(65) Prior Publication Data

US 2024/0080324 A1    Mar. 7, 2024

(51) Int. Cl.
*H04L 9/00* (2022.01)
*H04L 9/40* (2022.01)

(52) U.S. Cl.
CPC .......... *H04L 63/1416* (2013.01); *H04L 63/02* (2013.01); *H04L 63/0823* (2013.01)

(58) Field of Classification Search
CPC ................. H04L 63/1416; H04L 63/02; H04L 63/0823
USPC .......................................................... 726/23
See application file for complete search history.

(56) References Cited

U.S. PATENT DOCUMENTS

| | | | |
|---|---|---|---|
| 6,654,749 B1 | 11/2003 | Nashed | |
| 11,010,474 B2 * | 5/2021 | Hu | ....... G06F 11/3089 |
| 2013/0268485 A1 | 10/2013 | Cao | |
| 2014/0067835 A1 | 3/2014 | Harrison | |
| 2017/0286075 A1 * | 10/2017 | Kaipu | ............ G06F 21/57 |
| 2018/0288045 A1 * | 10/2018 | Karunakaran | ........ H04L 63/101 |
| 2020/0125468 A1 * | 4/2020 | Peddibhotla | .......... G06F 21/604 |
| 2020/0285761 A1 * | 9/2020 | Buck | ................ G06F 21/604 |
| 2022/0198011 A1 * | 6/2022 | Kumar | ............... G06F 21/554 |
| 2023/0128098 A1 * | 4/2023 | Agrawal | ............. H04L 67/14 709/224 |

\* cited by examiner

*Primary Examiner* — Christopher J Brown
(74) *Attorney, Agent, or Firm* — Van Pelt, Yi & James LLP

(57) ABSTRACT

Detection of unknown applications is disclosed, including: detecting an event associated with accessing an application; determining target information associated with the event; and identifying the application from the target information.

19 Claims, 10 Drawing Sheets

DETECTION OF UNKNOWN APPLICATIONS

BACKGROUND OF THE INVENTION

Software applications that are officially purveyed by an organization are monitored by the organization's security team. For example, the organization can purvey an application by establishing a contractual relationship with the application's vendor and/or assign one or more users of the organization certain (e.g., administrative) roles with respect to the application. A security team can monitor an officially purveyed application by making sure that the organization's configurations at the application are consistent with desired configurations. However, the security team of the organization cannot easily detect, let alone monitor, applications that are not officially purveyed by the organization but that are used in some capacity by some users associated with the organization. The existence of these undetected applications can pose a security risk to the organization's sensitive data as well as the organization's network. It would be desirable to detect utilized applications that are previously unknown to an organization.

BRIEF DESCRIPTION OF THE DRAWINGS

Various embodiments of the invention are disclosed in the following detailed description and the accompanying drawings.

DETAILED DESCRIPTION

Figure 1:
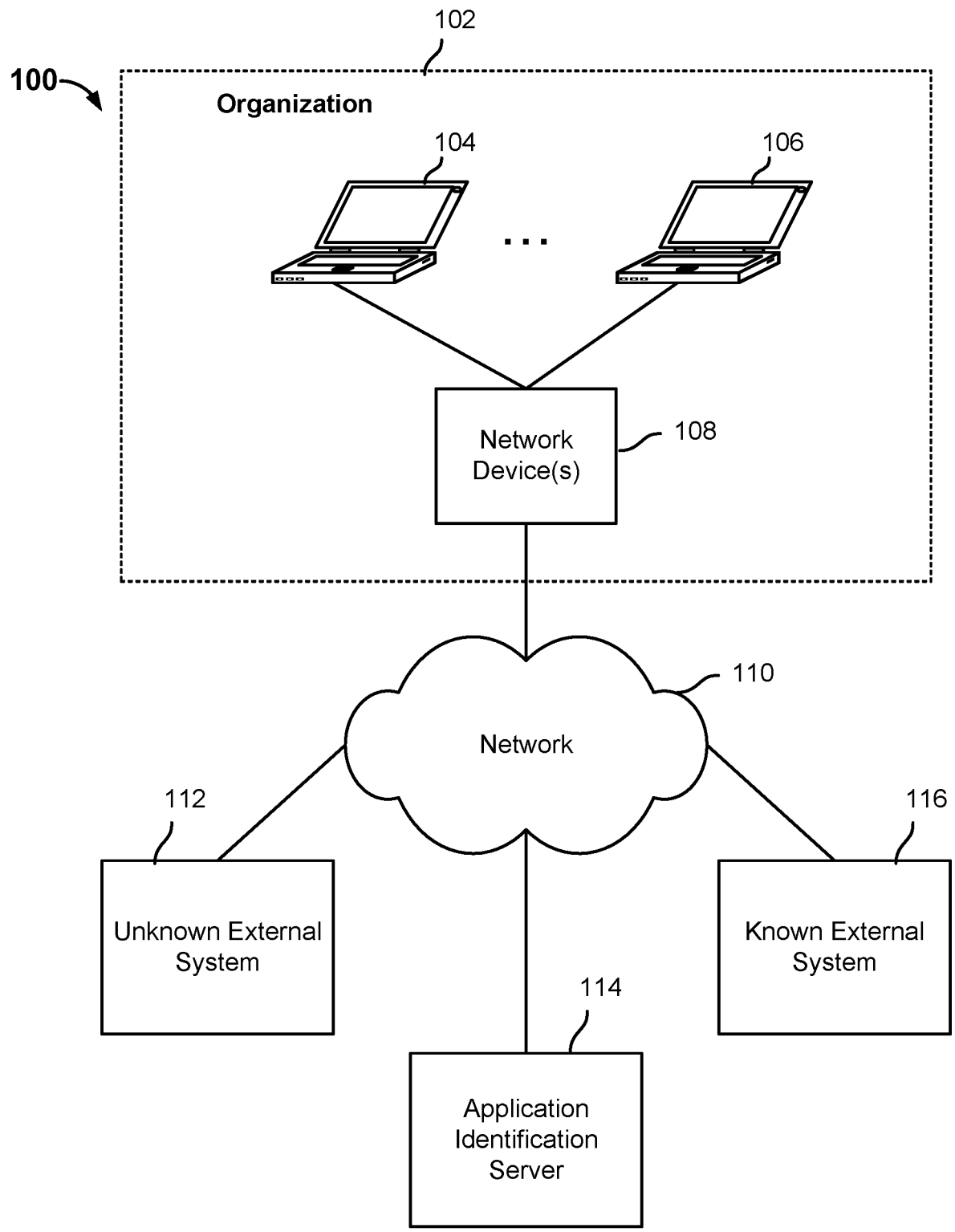
FIG. 1 is a diagram showing an embodiment of a system for detecting unknown applications.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Embodiments of detection of unknown applications are described herein. An event associated with accessing an application is detected. In various embodiments, the event comprises recorded activity that describes one or more accesses between a user associated with a given organization and the application. In various embodiments, an "application" comprises a software service that is provided by a system that is external to a system associated with the organization. Target information associated with the event is determined. In some embodiments, the "target information" comprises parameters of one or more predetermined types that are parsed from the event and are potentially usable to resolve a corresponding application. Example parameter types of target information include outbound host names, outbound domain names, outbound internet protocol (IP) addresses, web page fragments, universal resource locators (URLs), transport layer security (TLS) certificates, email addresses, usernames, company names, and application names. The application is identified from the target information. In various embodiments, at least a portion of the target information is resolved into identifying information associated with the application. For example, identifying information associated with the application comprises an application name or a vendor name of a vendor that is associated with the application.

FIG. 1 is a diagram showing an embodiment of a system for detecting unknown applications. As shown in FIG. 1, system 100 includes organization 102, network 110, unknown external system 112, application identification server 114, and known external system 116. In some embodiments, organization 102 is a particular organization such as a company, an enterprise, and a school. Organization 102 comprises host devices 104 and 106 (e.g., laptop computers) that are used by users of the particular organization such as employees, managers, contractors, customers, and guests, for example. Organization 102 also comprises network device(s) 108 that are nodes such as firewalls, routers, load balancers, and switches, for example. Network 110 comprises data and/or telecommunications networks.

Organization 102 comprises host devices (e.g., endpoints such as desktop computers, laptop computers, smart phones, tablet devices), such as host devices 104 and 106, that are used by the employees, contractors, and guests of organization 102. Host devices such as host devices 104 and 106 include processors that execute computer program code to run computer programs. In addition to host devices, organization 102 also comprises network device(s) 108 that provide network services to the host devices (e.g., such as host devices 104 and 106) of organization 102 by analyzing and/or intercepting network packets received over network 110. For example, network devices comprise firewalls, intrusion prevention systems (IPS), routers, and a web filter. For example, a user associated with organization 102 can use host device 104 to run a web browser or another computer program that the user can use to access, over network 110, applications that are provided by external systems, such as unknown external system 112 and known external system 116.

Known external system 116 comprises a server that is configured to provide a "known application" to organization 102. In various embodiments, the application that is provided by known external system 116 is "known" to organization 102 due to the purveyor team of organization 102 having established a (e.g., contractual) relationship with a vendor organization of known external system 116 and/or otherwise having approved its usage by users of organization 102. In a specific example, the known application that is provided by known external system 116 is a software as a service (Saas) application that provides, for example, data storage, workflow management, financial management, and/ or single sign-on applications. Furthermore, application identification server 114 stores data in a registry that is specific to organization 102 that indicates that organization 102 has an approved relationship with the "known" application that is provided by known external system 116. In a first example, the application that is provided by known external system 116 was previously "unknown" to organization 102 but became "known" to organization 102 due to application identification server 114 having detected the usage of the application from a recorded connection between a host device of organization 102 and known external system 116. In a second example, the application that is provided by known external system 116 was previously "unknown" to organization 102 but became "known" to organization 102 due to a purveyor team of organization 102 having informed application identification server 114 that organization 102 has established a formal (e.g., contractual) relationship with the vendor organization of known external system 116. Due to the application that is provided by known external system 116 being "known" to organization 102 and for which application identification server 114 has stored organization 102's corresponding approval, the usage, connection, and/or access to/through that application by any users associated with 102 via the host devices (e.g., host devices 104 and 106) can be monitored and/or restricted by a security team of organization 102. For example, given that the security team of organization 102 is aware of the application that is provided by known external system 116, the security team of organization 102 can configure and enable monitoring services to determine whether the actual configurations and/or other data that is stored by known external system 116 is consistent with the desired configurations that organization 102 had prescribed for the application.

Unknown external system 112 comprises a server that is configured to provide an "unknown application" to some users associated with organization 102. In various embodiments, the application that is provided by unknown external system 112 is "unknown" to organization 102 because the purveyor team of organization 102 has not established a (e.g., contractual) relationship with a vendor organization of unknown external system 112 or a security team of organization 102 has not been made aware that one or more users of organization 102 had used the application or had connected to unknown external system 112. For example, a user of organization 102 may have started to use the unknown application that is provided by unknown external system 112 without informing the purveyor team due to an urgent need for the services associated with the unknown application and/or a lack of awareness over the official purveyance procedure for new software services. Because the application that is provided by unknown external system 112 is "unknown" to organization 102, application identification server 114 also does not store data in a registry that is specific to organization 102 that indicates that organization 102 has an approved relationship with the "unknown" application that is provided by unknown external system 112. In some embodiments, whether an application is "known" or "unknown" is determined for a specific organization based on that organization's organization-specific registry and as such, an application that is "known" by Organization ABC can still be "unknown" to Organization DEF. A first disadvantage to organization 102 that some of its users are using and/or connecting to the "unknown" application provided by unknown external system 112 is that the security team of organization 102 is not able to monitor the unknown application or verify whether the configurations and/or other data stored by unknown external system 112 are consistent with desired security goals of organization 102. A second disadvantage to organization 102 that some of its users are using and/or connecting to the "unknown" application provided by unknown external system 112 is that the security team of organization 102 will not know to disable or install a software update for an unknown application that has been compromised (e.g., the target of a cyberattack), which could compromise the data and/or technology of organization 102.

As will be described in further detail below, application identification server 114 is configured to monitor events recorded at various sources (e.g., host devices, network devices, web browsers) associated with organizations (e.g., organization 102) to determine target information that is associated with applications that user(s) of each organization have used and/or connected to. As mentioned above, in some embodiments, the "target information" comprises parameters of one or more predetermined types that are parsed from the event and are potentially usable to resolve a corresponding application. Application identification server 114 is then configured to use the target information to determine the identifying information (e.g., names) of a corresponding application/vendor for which user(s) of an organization had used and/or connected to. Application identification server 114 is configured to compare the resolved application/vendor name to the registry of approved applications that is maintained for that organization to determine whether the resolved application/vendor name is found in the registry. If not, application identification server 114 is configured to determine that the resolved application/vendor name is associated with an "unknown" application relative to that organization. For this newly discovered "unknown" application, application identification server 114 is configured to assess any risks associated with the application via querying an internal knowledge base or a third-party source. For this newly discovered "unknown" application, application identification server 114 is further configured to facilitate a security team of the relevant organization to restrict/monitor usage by user(s) associated with the organization to the application, which leads the "unknown" application to become a "known" application to that organization. In some embodiments, in addition to detecting unknown applications, application identification server 114 is also configured to provide security monitoring of the previously unknown and now known applications in view of security policies that are configured by organization 102.

As shown in the example of FIG. 1, various embodiments described herein enable an application that is previously unknown to an organization to be programmatically detected via recorded activity that is associated with at least some users of the organization. The detected unknown application is then surfaced for the security team associated with the organization so that it becomes a known application to the organization and one that is restricted/monitored in accordance with the organizations' desired security goals. As such, in accordance with various embodiments described herein, the unauthorized actions of users of an organization with respect to the usage of and/or the connection to applications that are not known to an organization can cause to those applications to be eventually discovered and then subjected to the desired security precautions (e.g., monitoring and restriction) of the organization.

Figure 2:
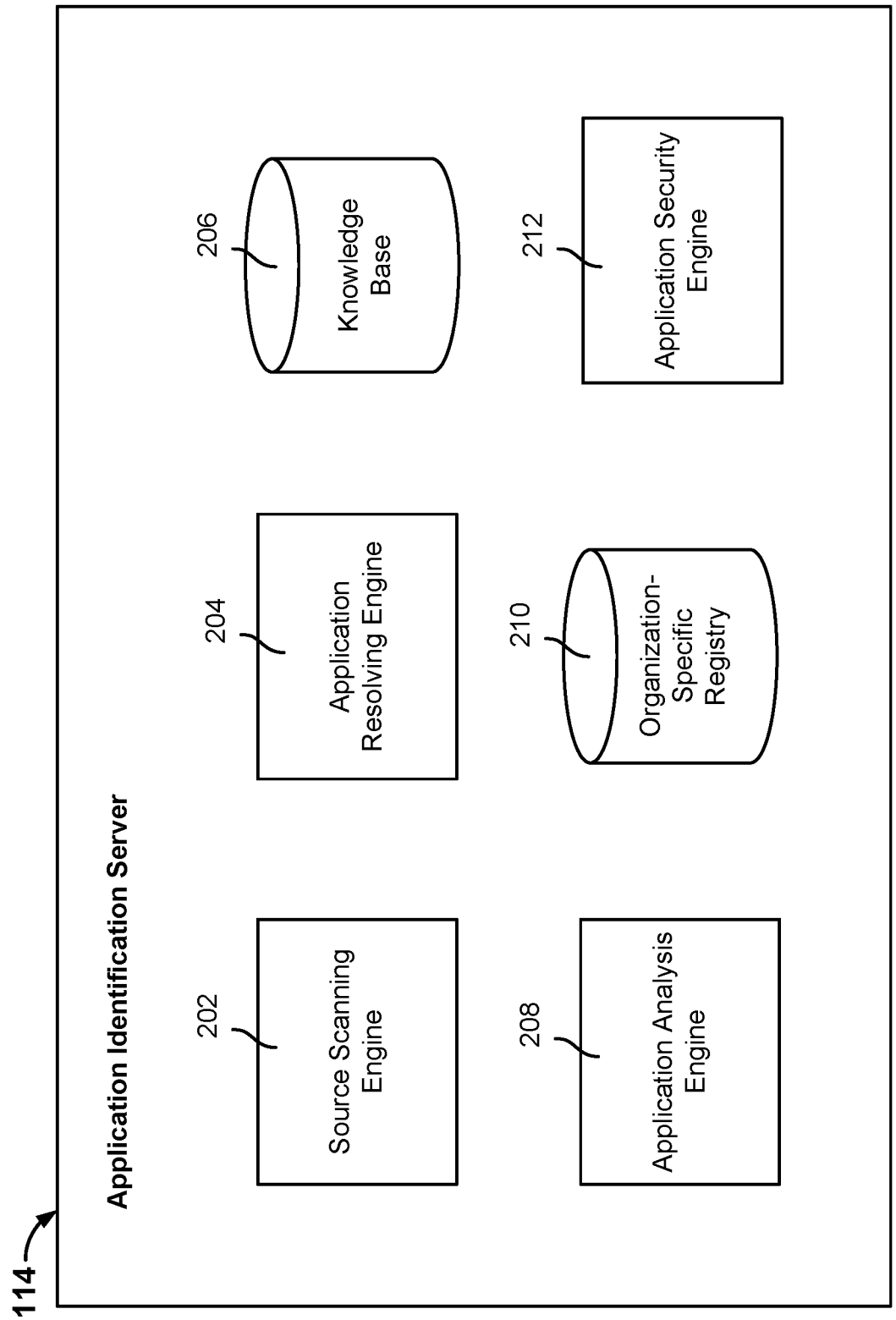
FIG. 2 is a diagram showing an example of an application identification server in accordance with some embodiments.

FIG. 2 is a diagram showing an example of an application identification server in accordance with some embodiments. In some embodiments, application identification server 114 of system 100 of FIG. 1 may be implemented using the example application identification server of FIG. 2. The example application identification server includes source scanning engine 202, application resolution engine 204, knowledge base 206, application analysis engine 208, organization-specific registry 210, and application security engine 212. Each of source scanning engine 202, application resolution engine 204, application analysis engine 208, and application security engine 212 may be implemented using hardware (e.g., a processor) and/or software. Each of knowledge base 206 and organization-specific registry 210 may be implemented using a database or any type of storage medium.

Source scanning engine 202 is configured to scan recorded activity associated with users at a given organization to determine target information that is potentially associated with applications. In various embodiments, source scanning engine 202 is configured to scan for recorded events that are indicative of usage and/or connection to outbound/external systems at various different types of sources. Example types of sources include events recorded at a host device associated with the organization (e.g., events recorded by the operating system and/or a web browser that is executing on a computer that is assigned and configured for an employee of the organization), recorded at a network device (e.g., events recorded by a network node such as a firewall), and activity recorded by a known external system (e.g., the known external system provides an application that is known to/approved by the organization). As will be described in further detail below, example types of recorded events that source scanning engine 202 may scan through to obtain target information include one or more of the following: recorded firewall/proxy logs, content (e.g., portions of webpages) that is cached by a web browser, summaries of connections between different devices (e.g., Netflow), data cached by password managers, logs recorded by a known application, a configuration stored at a known application that identifies inbound or outbound sources, and metadata recorded by a known application. In some embodiments, source scanning engine 202 is configured to parse through the scanned events to obtain target information. For example, parsing the scanned events to obtain target information may include determining parameters of predetermined types including one or more of the following: outbound host names, outbound domain names, outbound internet protocol (IP) addresses, web page fragments, universal resource locators (URLs), transport layer security (TLS) certificates, email addresses, usernames, company names, and application names.

Application resolution engine 204 is configured to obtain the target information that has been determined by source scanning engine 202 with respect to the given organization and is then configured to apply one or more types of resolution techniques to the target information to determine application(s) that correspond to the target information. A first example resolution technique that application resolution engine 204 can apply to a piece of target information such as an outbound IP address is to connect to the outbound IP address using transport layer security (TLS) and obtaining a TLS certificate associated with that IP address. Application resolution engine 204 can then parse the TLS certificate to determine whether the certificate includes identifying information (e.g., name) associated with an application/vendor with which the outbound IP address is associated. A second example resolution technique that application resolution engine 204 can apply to a piece of target information is to query knowledge base 206, which is populated with mappings between historically determined identifying information (e.g., name) associated with applications/vendors and corresponding target information. In some embodiments, knowledge base 206 is updated with new mappings over time as application resolution engine 204 is able to determine the corresponding identifying information (e.g., name) associated with applications/vendors for new target information that it obtains from source scanning engine 202. While application resolution engine 204 is configured to determine identifying information (e.g., name) associated with applications/vendors for new target information that has been determined with respect to a given organization, knowledge base 206 can be populated with mappings that have been determined from application/vendor name resolution techniques that have been applied to target information that has been determined for multiple organizations. As such, for a new piece of target information, application resolution engine 204 is configured to query knowledge base 206 to determine whether a matching mapping (that includes the corresponding application/vendor name for that piece of target information) already exists in knowledge base 206. A third example resolution technique that application resolution engine 204 can apply to a piece of target information is to call an application programming interface (API) that is provided by a search engine to perform a search on that piece of target information. Then, application resolution engine 204 is configured to parse through the webpages of at least a subset of the returned search results to determine a corresponding application/vendor name for that piece of target information.

In some embodiments, application resolution engine 204 is configured to apply one or more resolution techniques to the same piece of target information to determine a confidence associated with a corresponding application/vendor name. For example, the more resolution techniques that determine a substantially similar application/vendor name for a piece of target information, then the greater the confidence that is to be assigned to that application/vendor name.

Application analysis engine 208 is configured to compare each application/vendor name that is determined for the given organization by application resolution engine 204 to information that is specific to that given organization that is stored at organization-specific registry 210. In some embodiments, organization-specific registry 210 is configured to store for each organization for which the application identification server is configured to detect unknown applications, corresponding entries with identifying information associated with applications (and their corresponding vendors) that have been approved by that organization. Put another way, organization-specific registry 210 stores for each organization, entries corresponding to applications that are "known" to that organization. In some embodiments, each entry in organization-specific registry 210 comprises one or more of the following pieces of information: identifying information associated with an organization, identifying information associated with an application (or vendor thereof) that the organization has approved of, and the date that the application was last detected ("seen") by the application identification server for that organization. In the event that application analysis engine 208 determines that an application/vendor name that is determined for the given organization matches an entry corresponding to that organization in organization-specific registry 210, then application analysis engine 208 determines that the application is a "known" application that was previously approved by the organization. For an application that is determined to be "known" to the given organization, in some embodiments, application analysis engine 208 is configured to update the date that the application was last seen field in the corresponding organization-specific registry 210 to the current date.

Otherwise, in the event that application analysis engine 208 determines that an application/vendor name that is determined for the given organization does not match an entry corresponding to that organization in organization-specific registry 210, then application analysis engine 208 determines that the application is an "unknown" application that was not known to and/or not previously approved by the organization. For an application that is determined to be "unknown" to the given organization, in some embodiments, application analysis engine 208 is configured to perform analysis on the "unknown" application including, for example, aggregating information on the application, determining a level of access by user(s) of the organization to the application, and determining a level of access by the application through user(s) of the organization. For example, examples types of information to be aggregated by application analysis engine 208 on an "unknown" application include a company standing associated with a vendor of the application, statistics associated with a company associated with the vendor, privacy rating associated with the vendor, security ratings associated with the vendor, compliance ratings associated with the vendor, company policies associated with the vendor, contact information associated with the vendor, whether the application and/or its corresponding vendor has historically been associated with any security breaches, and which/how many users of the organization have used and/or connected to the application.

Application security engine 212 is configured to receive, from application analysis engine 208, determined analysis of "unknown" applications with respect to a given organization. For each such application that is "unknown" to a given organization, application security engine 212 is configured to use the received analysis to perform one or more types of actions to add a layer of security around the organization with respect to that application. A first example action is that application security engine 212 can prompt an administrative/security user associated with the organization at a user interface to view the determined analysis regarding the detected "unknown" application and to query whether the user would approve the organization's continued usage of the application and if so, desired securities policies to implement regarding such usage. In the event that the user approves the organization's continued usage of the application, application security engine 212 is configured to add a new entry in organization-specific registry 210 to indicate that the given organization has approved this application, which is now considered a "known" application relative to that organization. A second example action is that application security engine 212 can limit the types of users/number of users and level of those users' access to the application in accordance with the user input desired securities policies. A third example action is that application security engine 212 can determine whether the current configurations/data stored by the application for the given organization is consistent with the desired configurations associated with the user input desired securities policies.

Figure 3:
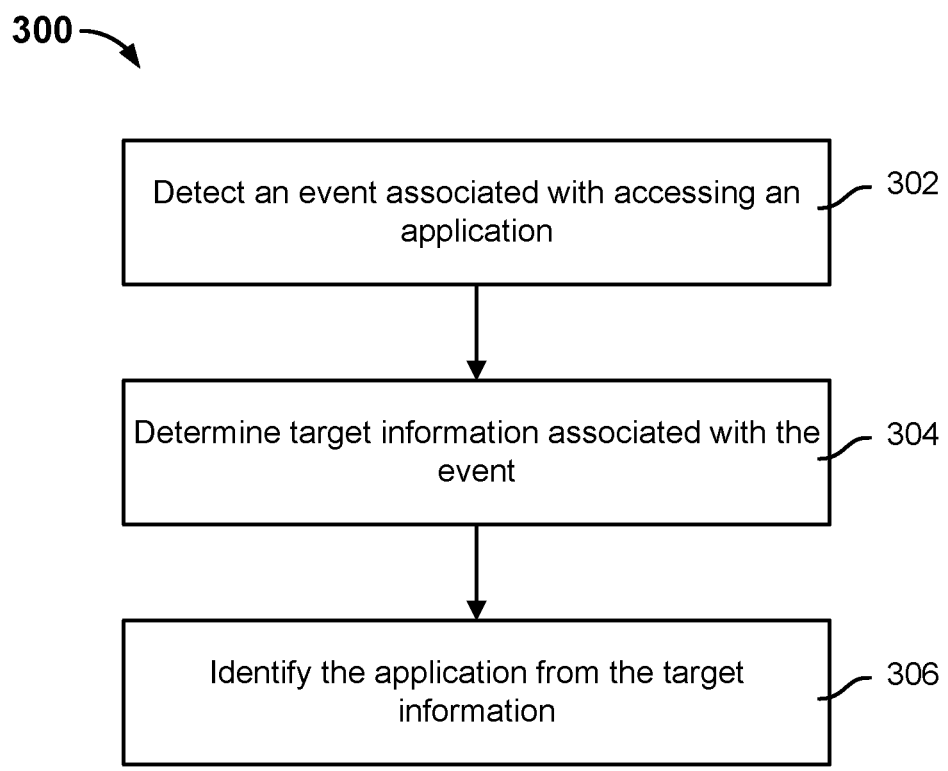
FIG. 3 is a flow diagram showing an embodiment of a process for detecting unknown applications.

FIG. 3 is a flow diagram showing an embodiment of a process for detecting unknown applications. In some embodiments, process 300 may be implemented at application identification server 114 of system 100 of FIG. 1.

At 302, an event associated with accessing an application is detected. The event is determined from activity recorded at host devices and network devices associated with a particular organization. In various embodiments, the recorded activity describes outbound connections between host devices associated with the organization to external systems, which are potentially applications that are providing services to one or more users associated with the organization. As mentioned above, example types of sources at which to detect for events include a host device associated with the organization (e.g., specifically, the operating system and/or a web browser that is executing on the host device that is assigned to and configured for an employee of the organization), a network device (e.g., a network node such as a firewall), and a known external system that provides an application that is known to/approved by the organization.

At 304, target information associated with the event is determined. In some embodiments, target information comprises parameters of one or more predetermined types that are parsed from the event and are potentially usable to resolve a corresponding application (or vendor of the application). Example parameter types of target information include outbound host names, outbound domain names, outbound internet protocol (IP) addresses, web page fragments, universal resource locators (URLs), transport layer security (TLS) certificates, email addresses, user names, company names, and application names.

At 306, the application is determined from the target information. One or more resolution techniques are applied to each parameter of the target information that is determined from the event to determine, if possible, identifying information associated with a corresponding application or vendor thereof. In some embodiments, it is then determined whether the application that resolved from the target information is one that is already "known" to that organization or one that is "unknown" based on information that is stored in a registry of approved/known applications that is specific to that organization. In the event that the resolved application is unknown to (not yet approved by) the organization, further analysis is performed on the application. The analysis on the application could be presented at a user interface for an administrative/security user associated with the organization and/or could be used to determine a restriction on access to the application by one or more users at the organization.

Figure 4:
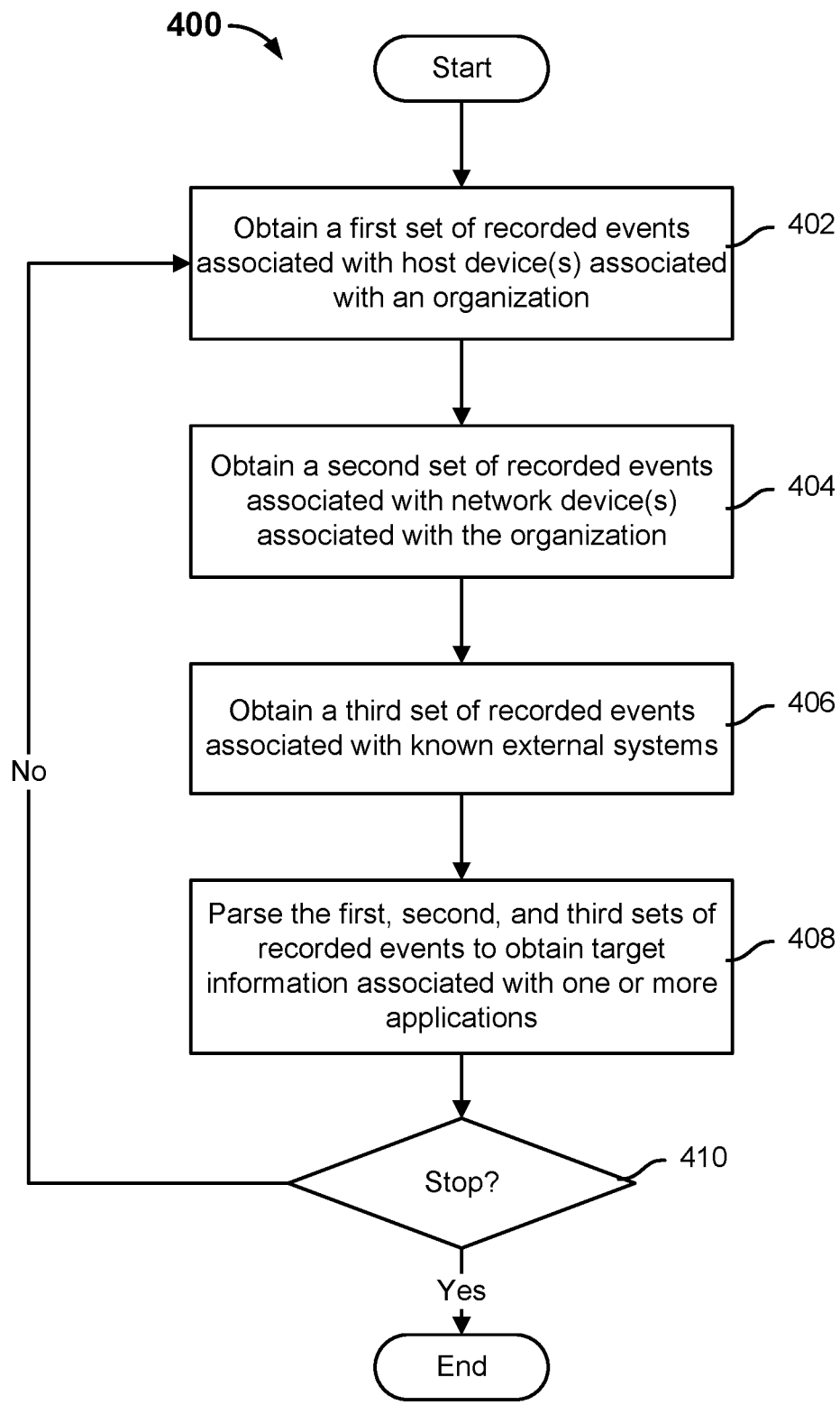
FIG. 4 is a flow diagram showing an example of a process for detecting recorded events associated with device(s) associated with an organization in accordance with some embodiments.

FIG. 4 is a flow diagram showing an example of a process for detecting recorded events associated with device(s) associated with an organization in accordance with some embodiments. In some embodiments, process 400 may be implemented at application identification server 114 of system 100 of FIG. 1. In some embodiments, steps 302 and 304 of process 300 of FIG. 3 may be implemented, at least in part, using process 400.

Process 400 is an example process for continuously determining target information from recorded events associated with an organization.

At 402, a first set of recorded events associated with host device(s) associated with an organization is obtained. Examples of sources of recorded events are endpoint/host devices (e.g., desktop computers, laptop computers, smart devices) that are configured for and assigned to employees or contractors of an organization. Specifically, the sources of recorded events include data recorded by the operating system and data recorded by a web browser. In a first example type of events recorded at a host device, a laptop network filter or kernel module comprises an agent in a host device's operating system and that can record endpoint detection and antivirus events including destination IP addresses to which the host device had connected. In a second example of events recorded at a host device, laptop firewall or laptop proxy logs can store activities that occur at the device. In a third example of events recorded at a host device, various operating system components (e.g., laptop DNS cache) can store IP addresses and host devices to which the present device had connected. In a fourth example of events recorded at a host device, a web browser can cache at least fragments of webpages that were visited. In a fifth example of events recorded at a host device, a password manager or cache (e.g., that is built into a web browser) can store URLs or hostnames associated with webpages for which passwords were stored.

At 404, a second set of recorded events associated network device(s) associated with the organization is obtained. Examples of sources of recorded events that can be found at the network devices (e.g., firewall), which are configured to forward and/or filter through network traffic that is inbound to or outbound from the host devices associated with the organization, include logs or other records of network activity. In a first example type of events recorded at a network device, a router may store summaries of network data (e.g., TCP connections) between different devices. In a second example type of events recorded at a network device, a proxy server, a firewall, a virtual private network (VPN), a generic routing encapsulation (GRE) a router, a service security edge (SSE), and/or a secure access service edge (SASE) can store logs that describe traffic over the network.

At 406, a third set of recorded events associated with known external system(s) is obtained. Examples of sources of recorded events that can be found at known external systems, which provide known applications for the organization, include stored configurations made by the organization and/or other metadata stored by the known external systems. In a first example type of events recorded at a known external system, the known external system can store logs for users/administrators that describe which users have logged into the known application that it provides, which users had attempted to log into the known application, and which host devices/IP addresses the known application had tried to connect to. In a second example type of events recorded at a known external system, the known external system can store configurations that described allowed inbound or outbound sources. In a third example type of events recorded at a known external system, the known external system can store authentication extensions/tokens associated with another (potentially unknown) application. In a fourth example type of events recorded at a known external system, the known external system can store metadata associated with other (potentially unknown) applications that are integrated with the known application provided by the known external system.

At 408, the first, second, and third sets of recorded events are parsed to obtain target information associated with one or more applications. The disparate sets of recorded events are scanned and parsed through to determine target information. As mentioned above, target information includes parameters of predetermined types such as, for example, outbound host names, outbound domain names, outbound internet protocol (IP) addresses, web page fragments, universal resource locators (URLs), transport layer security (TLS) certificates, email addresses, usernames, company names, and application names.

At 410, whether the process is to stop is determined. In the event that the process for obtaining target information for the organization is to be stopped is determined, process 400 ends. Otherwise, in the event that the process for obtaining target information for the organization is not to be stopped is determined, control is returned to 402. For example, target information is continuously obtained for an organization in the process of detecting unknown applications, unless the process is desired to be stopped (e.g., in response to a user instruction).

Each of FIGS. 5, 6, and 7, below, describes an example application resolution process that can be separately applied to a piece of target information that is obtained using a process such as process 400. In some embodiments, one or more application resolution processes can be applied to a single piece of target information to determine identifying information (e.g., a name) of a corresponding application (or vendor thereof) and a corresponding confidence for that application/vendor name. For example, the greater the number of resolution processes that are applied to the same piece of target information and that determine consistent corresponding application/vendor names, the greater the confidence is attributed to that application/vendor name.

Figure 5:
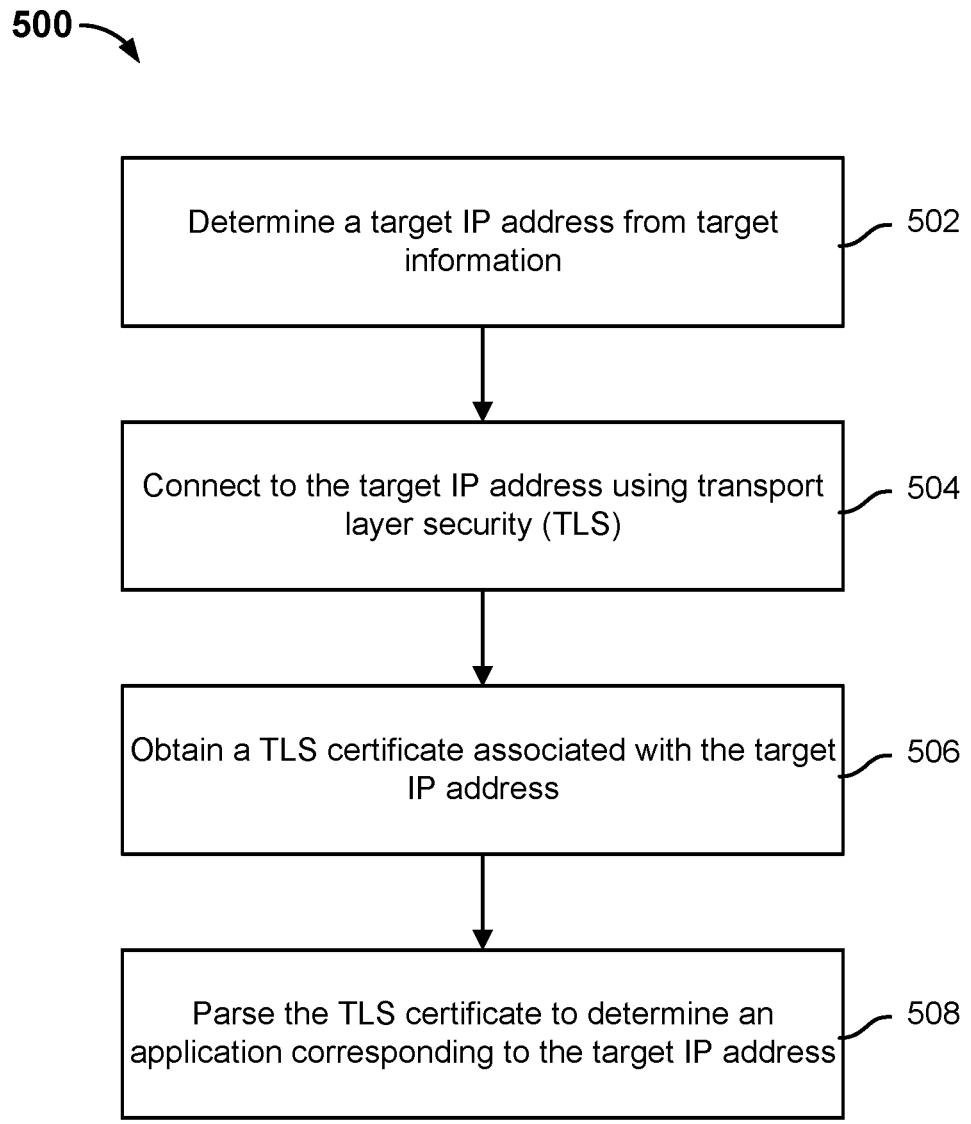
FIG. 5 is a flow diagram showing an example of a process for determining an application using a transport layer security certificate in accordance with some embodiments.

FIG. 5 is a flow diagram showing an example of a process for determining an application using a transport layer security certificate in accordance with some embodiments. In some embodiments, process 500 may be implemented at application identification server 114 of system 100 of FIG. 1. In some embodiments, step 306 of process 300 of FIG. 3 may be implemented, at least in part, using process 500.

Process 500 is one example process for resolving the identifying information associated with an application corresponding to an obtained target IP address (e.g., which is a piece of target information that is obtained using a process such as process 400 of FIG. 4) and involves connecting to the target IP address using transport layer security.

At 502, a target IP address is determined from target information. As mentioned above, the target information can be determined from events recorded in association with a given organization (e.g., using a process such as process 400 of FIG. 4). In addition or alternative to the target IP address, a target hostname can also be determined from the target information.

At 504, the target IP address is connected to using transport layer security (TLS). A TLS connection is made on a predetermined port of the target IP address. For example, the predetermined port is a conventional port (e.g., 443).

At 506, a TLS certificate associated with the target IP address is obtained. In response to the TLS connection, the web server associated with the target IP address should return its TLS certificate. For example, the certificate is a x.509 certificate. In addition or alternatively, a TLS connection can also be made on a predetermined port of the target hostname to obtain the TLS certificate.

At 508, the TLS certificate is parsed to determine an application corresponding to the target IP address. The TLS certificate should include, among other things, identity information associated with the web server. For example, the identity information that is included in the obtained TLS certificate may include a hostname or the name of an organization/individual. The identity information can then be used to identify the application and/or the vendor name associated with the target IP address.

However, in some instances, process 500 may not be successful in determining the application/vendor name associated with the target IP address. For example, the TLS certificate that is returned could be a generic certificate that does not provide the identity information associated with the application but rather, the identity information of the cloud computing platform that hosts the application. In another example, the TLS certificate will only be returned if the application identification server provides the name of the predicted application that the target IP address is associated and if no such prediction is available, the TLS certificate with the desired identity information will not be returned. In yet another example, if the web server associated with the target IP address is not listening for TLS connections at the predetermined port (e.g., 443), then the TLS certificate also cannot be returned.

Figure 6:
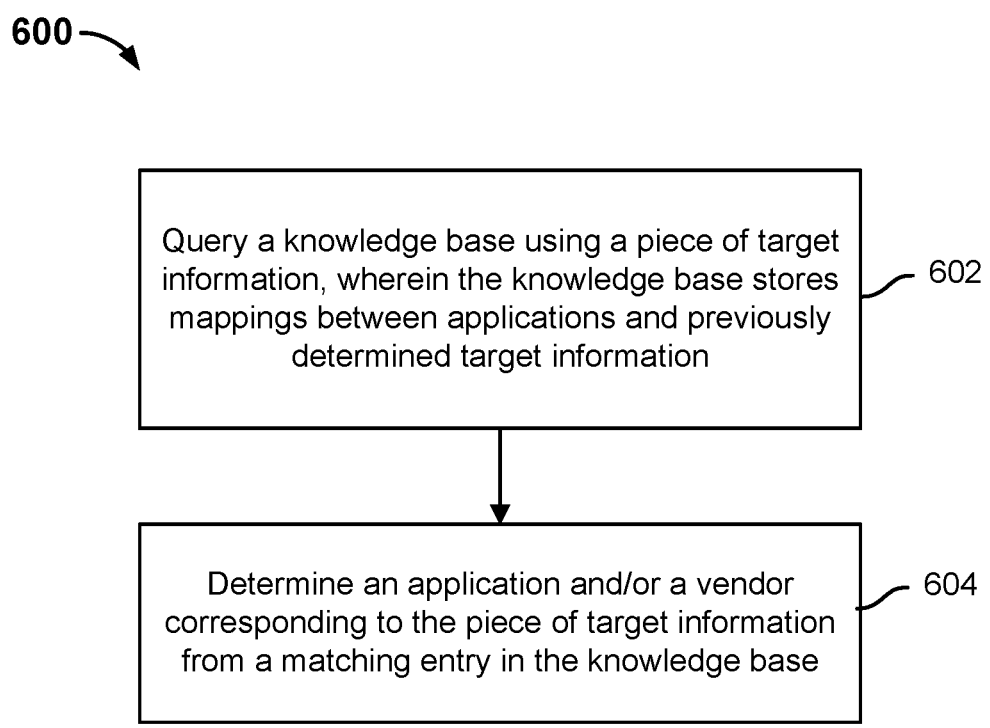
FIG. 6 is a flow diagram showing an example of a process for determining an application using a knowledge base in accordance with some embodiments.

FIG. 6 is a flow diagram showing an example of a process for determining an application using a knowledge base in accordance with some embodiments. In some embodiments, process 600 may be implemented at application identification server 114 of system 100 of FIG. 1. In some embodiments, step 306 of process 300 of FIG. 3 may be implemented, at least in part, using process 600.

Process 600 is another example process for resolving the identifying information associated with an application corresponding to a piece of target information (e.g., that is obtained using a process such as process 400 of FIG. 4) and involves querying a maintained knowledge base that stores mappings between pieces of target information (obtained from recorded events associated with one or more organizations) and their previously determined application/vendor identifying information (e.g., names).

At 602, a knowledge base is queried using a piece of target information, wherein the knowledge base stores mappings between applications and previously determined target information. As mentioned above, a knowledge base can store entries with mappings between previously determined target information (e.g., from the recorded events detected for one or more organizations) and their corresponding application/vendor identifying information. In some embodiments, the mappings in the knowledge base could have been previously determined using a process such as process 500 of FIG. 5 or process 700 of FIG. 7. In some embodiments, the mappings in the knowledge base could have been previously determined by querying known applications for target information associated with other applications that have integrated with the known application. For example, known app APP 1 has been integrated with APP 2 and so pieces of target information (e.g., an IP address, a domain name) that are known to APP 1 regarding APP 2 can be queried from APP 1 and added as mappings to the knowledge base. As such, the knowledge base can be queried with newly determined target information (e.g., an IP address, a hostname, a domain name, a web page fragment, a URL, an email address, a user name, a company name, or a TLS certificate) to determine whether a matching entry (e.g., the matching entry is one that included matching target information) in the knowledge base already exists.

At 604, an application and/or vendor corresponding to the piece of target information is determined from a matching entry in the knowledge base. In the event that a matching entry is found in the knowledge base, then the application and/or vendor identifying information (e.g., name) that is stored in the matching entry is obtained.

However, process 600 may not be successful in determining the application/vendor name associated with the piece of target information in the event that the knowledge base does not already store that piece of target information in any of its entries.

Figure 7:
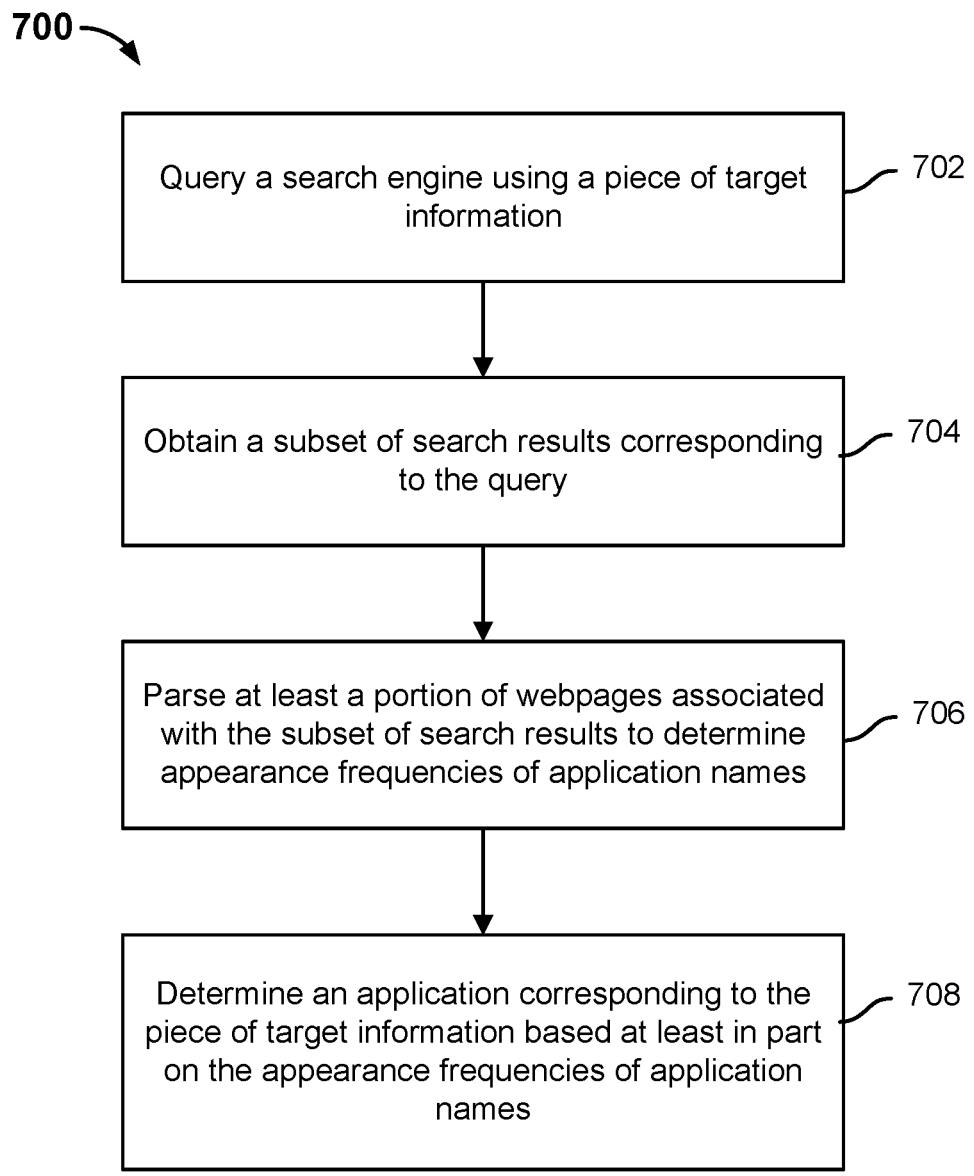
FIG. 7 is a flow diagram showing an example of a process for determining an application by querying a search engine in accordance with some embodiments.

FIG. 7 is a flow diagram showing an example of a process for determining an application by querying a search engine in accordance with some embodiments. In some embodiments, process 700 may be implemented at application identification server 114 of system 100 of FIG. 1. In some embodiments, step 306 of process 300 of FIG. 3 may be implemented, at least in part, using process 700.

Process 700 is yet another example process for resolving the identifying information associated with an application corresponding to a piece of target information (e.g., that is obtained using a process such as process 400 of FIG. 4) and involves querying a search engine using the piece of target information and analyzing the search results.

At 702, a search engine is queried using a piece of target information. A designated search engine can be queried using a new piece of target information (e.g., an IP address, a hostname, a domain name, a web page fragment, a URL, an email address, a user name, a company name, or a TLS certificate) by calling an API associated with the search engine.

At 704, a subset of search results corresponding to the query is obtained. The search engine is configured to determine a ranked list of search results, which comprises webpages or URLs thereof that match the input piece of target information. In some embodiments, a predetermined number of the matching search results or a predetermined number of pages of the matching search results are selected to be processed to resolve an application that corresponds to the piece of target information.

At 706, at least a portion of webpages associated with the subset of search results is parsed to determine appearance frequencies of application names. In some embodiments, each webpage associated with each of a selected subset of search results is programmatically visited and its content is parsed to determine the frequency with which application names appear within the webpages.

At 708, an application corresponding to the piece of target information is determined based at least in part on the appearance frequencies of application names. For example, the application that is associated with the application names that appear with the greatest frequency is determined as the correct application to which that piece of information is associated.

FIGS. 5, 6, and 7 describe only three example types of techniques for resolving an application based on determined target information. Another potential resolution technique is to query a third-party intelligence service that stores mappings between target information and applications.

Figure 8:
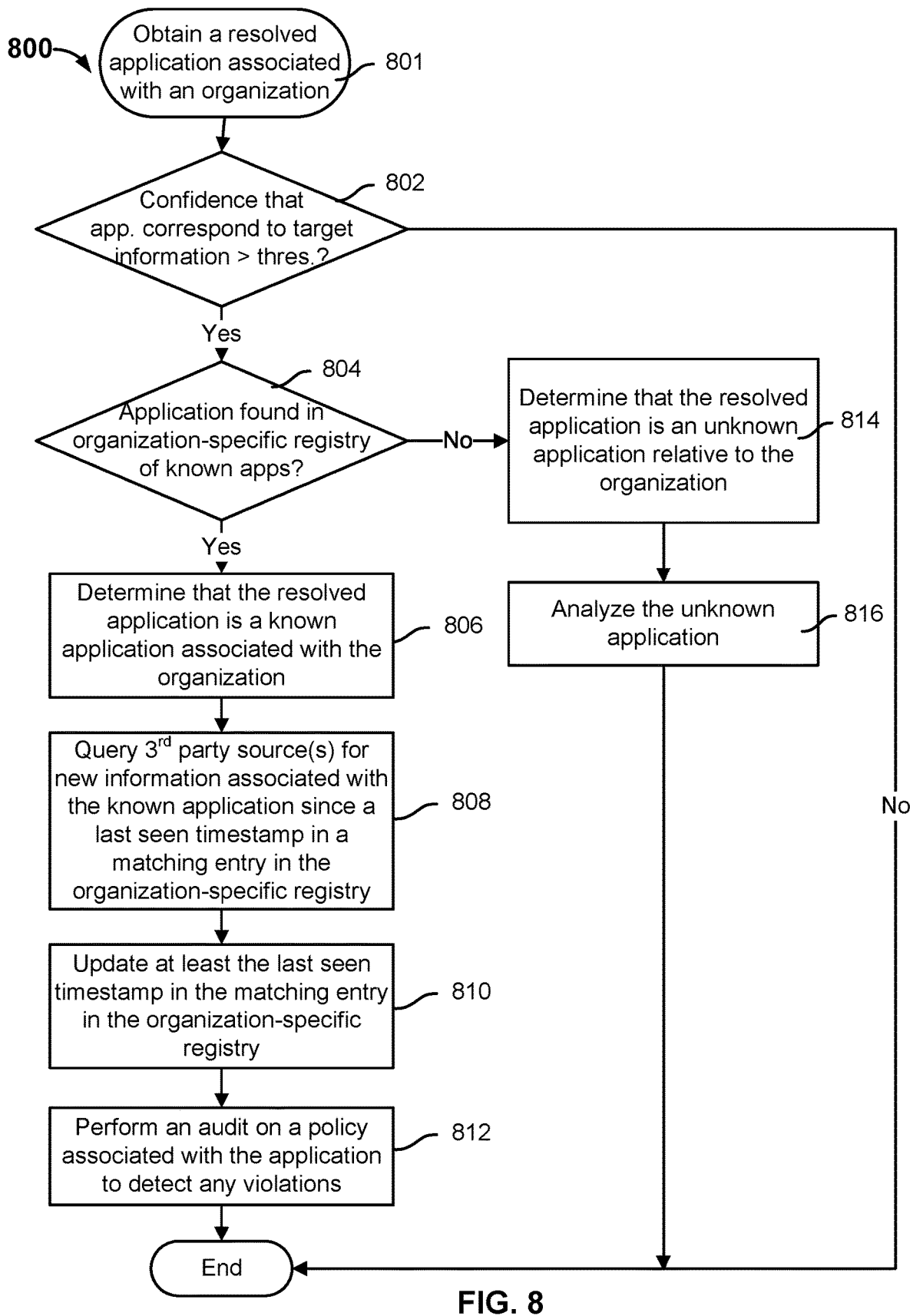
FIG. 8 is a flow diagram showing an example of a process for comparing a resolved application to an organization-specific registry in accordance with some embodiments.

FIG. 8 is a flow diagram showing an example of a process for comparing a resolved application to an organization-specific registry in accordance with some embodiments. In some embodiments, process 800 may be implemented at application identification server 114 of system 100 of FIG. 1.

Process 800 describes an example process of determining whether an application that has been resolved from target information that was determined for a given organization (e.g., using process 400 of FIG. 4) is already "known" to that organization by checking that organization's organization-specific registry. In some embodiments, an instance of process 800 can be performed for each application that is resolved from target information that was determined for the given organization.

At 801, a resolved application associated with an organization is determined. In some embodiments, the application was resolved from one or more pieces of target information that were determined for the organization using one or more resolution techniques (e.g., including process 500 of FIG. 5, process 600 of FIG. 6, or process 700 of FIG. 7).

At 802, whether a confidence that the resolved application corresponds to target information associated with an organization is greater than a threshold is determined. In the event that the confidence that the application corresponds to target information associated with an organization is greater than a threshold, control is transferred to 804. Otherwise, in the event that the confidence that the application corresponds to target information associated with an organization is equal to or less than the threshold, the process ends.

As mentioned above, one or more resolution techniques (e.g., including process 500 of FIG. 5, process 600 of FIG. 6, or process 700 of FIG. 7) can be applied to each piece of target information that was determined for a given organization. Each time that a piece of target information resolves into a given application, the confidence that that application corresponds to (e.g., was connected to and/or used by user(s) of) the organization increases. As such, the more resolution techniques of target information that was determined for the given organization converges on a particular application, the greater the confidence that is determined for that application. In the event that the confidence of the resolved application is greater than a predetermined threshold confidence level, then there is sufficient certainty that the resolved application corresponds to the organization and so it is compared to the given organization's organization-specific registry. Otherwise, in the event that the confidence of the resolved application is less than or equal to a predetermined threshold confidence level, then there is not sufficient certainty that the resolved application corresponds to the organization and so it is not compared to the given organization's organization-specific registry and the process ends.

At 804, whether the application is found in an organization-specific registry of known applications is determined. In the event that the application is found in an organization-specific registry of known applications, control is transferred to 806. Otherwise, in the event that the application is not found in an organization-specific registry of known applications, control is transferred to 814.

As mentioned above, each organization is associated with an organization-specific registry that store mappings between that organization and the identifying information (e.g., names) of applications/vendors that the organization had previously approved. An application that is "known" to one organization may not (yet) be "known" to another organization and so each organization-specific registry stores what is currently "known" to that particular organization. In some embodiments, each entry in the organization-specific registry also stores a date/timestamp at which a corresponding "known" application was last detected/seen (e.g., resolved from target information) for that organization. For example, the organization-specific registry is continuously updated over time with new entries based on the detection of unknown applications that then become approved by the organization.

At 806, it is determined that the resolved application is a known application relative to the organization. In the event that the name of the resolved application (or its vendor) matched the name of an application (or its vendor) that is stored in the organization-specific registry, then it is determined that the resolved application is a "known" application that the organization has already approved (e.g., and had implemented security precautions for).

At 808 third-party source(s) are queried for new information associated with the application since a last seen date/timestamp in a matching entry in the organization-specific registry. One or more third-party sources that track ratings on privacy, company, and/or financial, for example, can be queried for the known application to determine if any updated information has become available since the last seen date/timestamp that is stored in the organization-specific registry.

At 810, at least the last seen date/timestamp is updated in the matching entry in the organization-specific registry. The last seen date/timestamp in the matching entry in the organization-specific registry is updated with the date/timestamp at which the comparison with the organization-specific registry is performed.

At 812, an audit is performed on a policy associated with the known application to detect any violations. In some embodiments, given that the resolved application is one that is already "known" to the application, it is possible that a policy had been previously configured for and assigned to the known application with respect to the given organization. For example, the policy had described desired configurations (e.g., levels of access to certain types of data) at the known application for certain types of users associated with the given organization. To perform an audit of the policy includes, for example, determining the actual configurations at the known application for the types of users that are described in the policy and then comparing the actual configurations to the desired configurations to determine whether any discrepancies (and therefore risks), exist. It may be desirable to perform an audit of a policy on a known application to ensure that changes at the known application do not violate existing desired configurations for that application.

At 814, it is determined that the resolved application is an unknown application relative to the organization.

Figure 9:
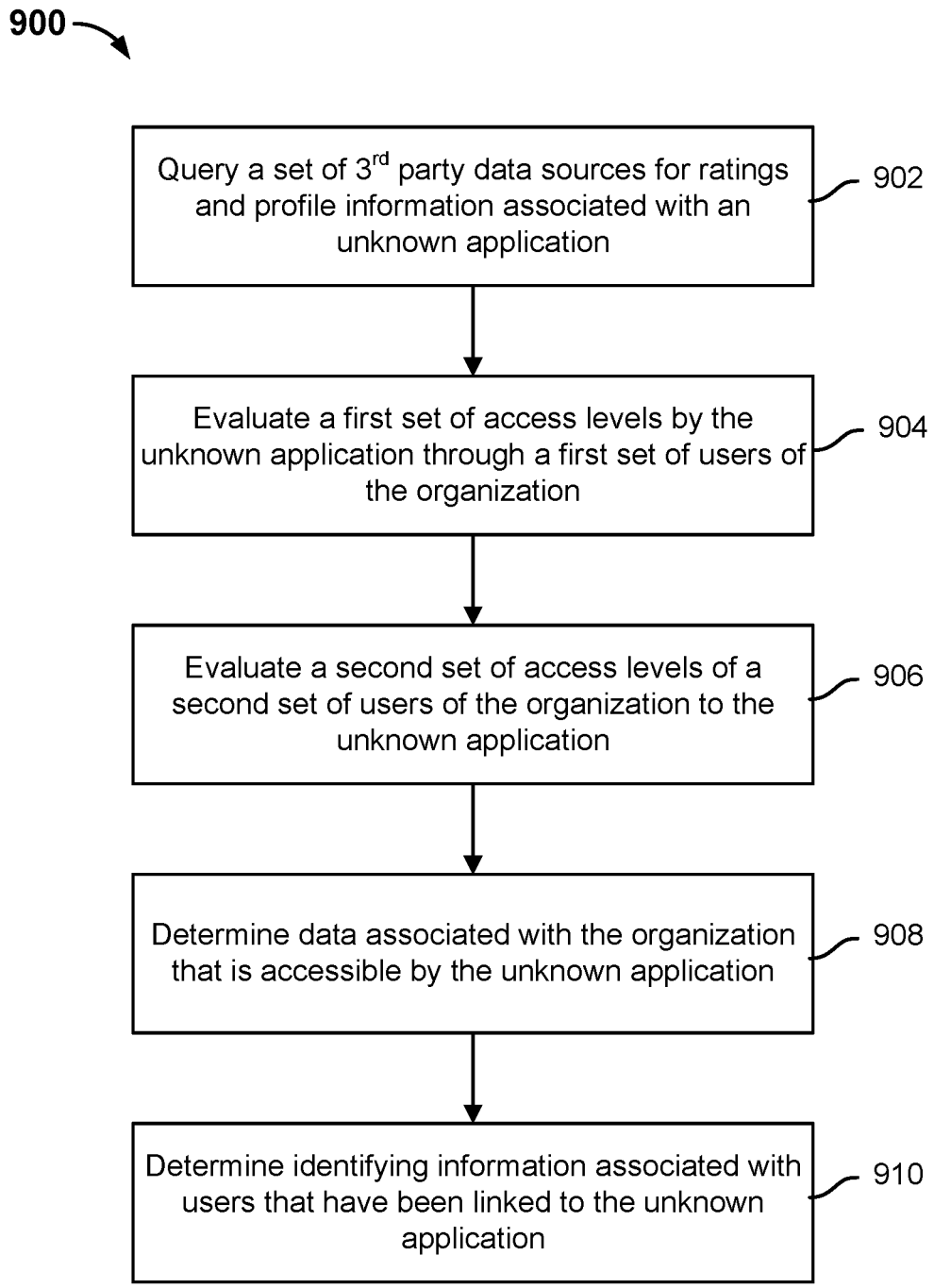
FIG. 9 is a flow diagram showing an example of a process for performing analysis on a determined unknown application with respect to a given organization in accordance with some embodiments.

At 816, the unknown application is analyzed. The unknown application is analyzed by obtaining/aggregating additional information on the application, which could lead to implementing restrictions on access to the unknown application for user(s) of the given organization. FIG. 9, below, describes one example process for performing analysis on an unknown application that is determined for a given organization.

FIG. 9 is a flow diagram showing an example of a process for performing analysis on a determined unknown application with respect to a given organization in accordance with some embodiments. In some embodiments, process 900 may be implemented at application identification server 114 of system 100 of FIG. 1.

Process 900 describes an example process of programmatically performing analysis on an application that has been determined to be unknown relative to a given organization (e.g., using process 800 of FIG. 8). In some embodiments, an instance of process 900 can be performed for each unknown application that was determined for the given organization.

At 902, a set of third-party data sources is queried for ratings and profile information associated with an unknown application. One or more third-party data sources that aggregate and track ratings, profile information, and incident information of applications and/or vendors thereof are queried for the unknown application. For example, third-party data sources can be queried, based on the name of the unknown application/vendor, for one or more of the following: a company standing, company statistics, a risk, a privacy rating, a security rating, company contact information, government information, a compliance rating, company policies, and recent (e.g., security, financial, or reputational) incidents.

At 904, a first set of access levels by the unknown application through a first set of users of the organization is evaluated. For example, the access levels (e.g., administrative, non-administrative, read, write, and/or delete) associated with roles of the users of the organization that have accessed/connected to the unknown application are determined. In general, determining the access levels of the unknown application through the first set of users of the organization comes down to calculating the level of access that a user has (by analyzing various configurations), taking into consideration the restrictions carried by the application (often referred to as "scopes", "permissions", or "installation mode"), and then various system type-specific other factors.

At 906, a second set of access levels of a second set of users of the organization to the unknown application is evaluated. For example, the level (e.g., administrative, non-administrative, read, write, and/or delete) of access of user(s) of the organization that can access the unknown application is determined. For example, if the unknown application is connecting to AcmeApp as User1, the access goes from the unknown application into AcmeApp on behalf of User1. That does not necessarily give User1 any access to the unknown application (other than the typical prerequisite that User1 could log into the unknown application to initiate the connectivity to AcmeApp, which is not strictly required but is almost always the case). As such, if it is determined that the unknown application is connecting to AcmeApp as User1, then it is inferred that User1 has access to the unknown application.

At 908, data associated with the organization that is accessible by the unknown application is determined. For example, which data of the organization that is accessible by the unknown application may be determined/computed/estimated as a function of the access levels associated with roles of the users of the organization that have accessed/connected to the unknown application that were determined at step 906.

At 910, identifying information associated with users that have been linked to the unknown application is determined. Which users of the organization that are linked to (e.g., have connected to, have accessed, or have otherwise used) the unknown application are determined. For example, to determine which users of the organization that are linked to the unknown application can be determined based on analyzing recorded events that associate target information associated with the unknown application and identifying information associated with a user, integrations between user accounts and the unknown application, and users' web metadata that include data associated with the unknown application. In some embodiments, the number of users at the organization that are linked to the unknown application are determined (e.g., this information may become relevant when the organization later acquires a license to use the application and the license is determined as a function of the number of users at the organization).

In addition to the steps of process 900, in some embodiments, in analyzing the unknown application, the name of the unknown application/vendor can be compared against other information such as a list of restricted vendors and a list of known vendors.

Figure 10:
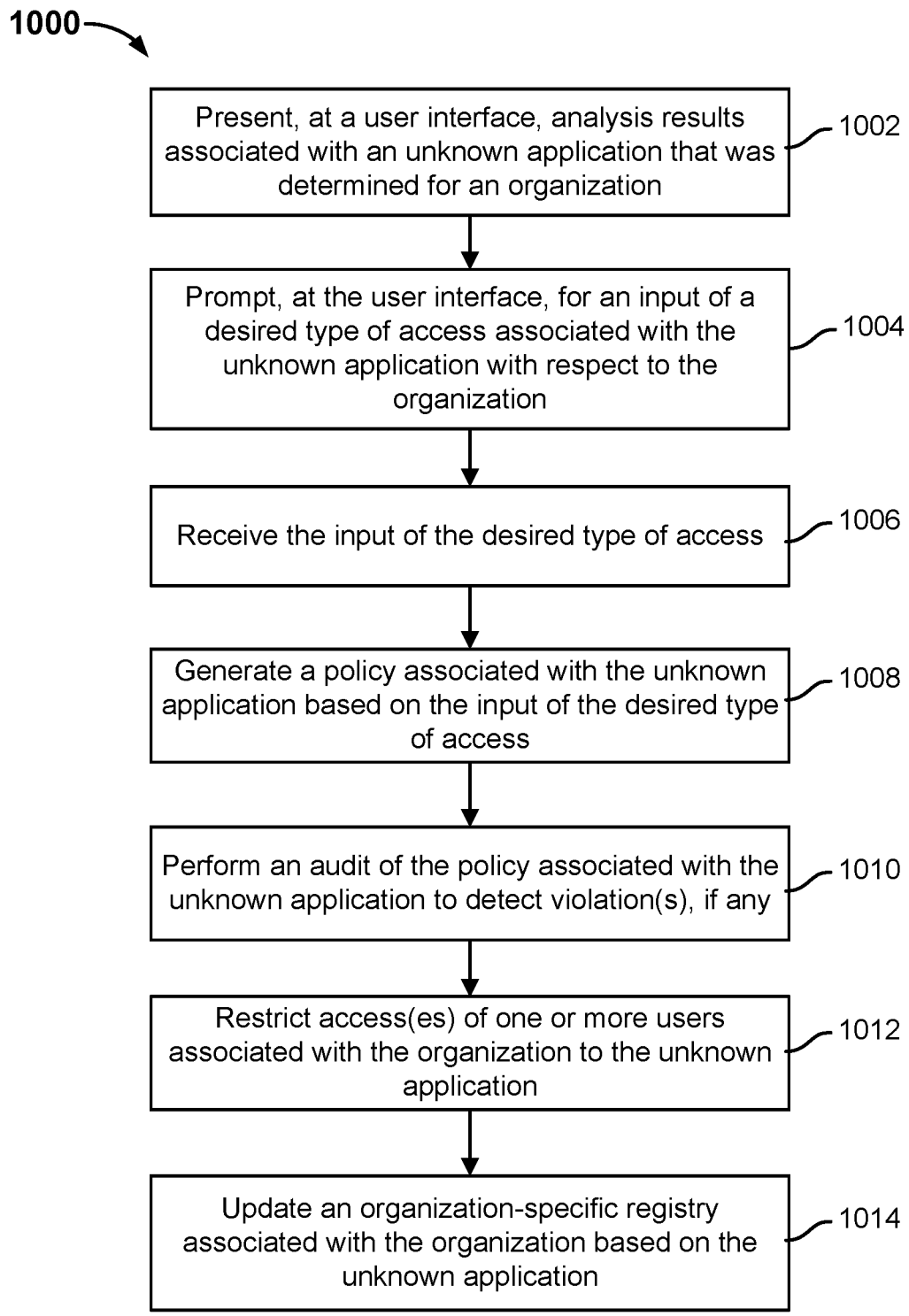
FIG. 10 is a flow diagram showing an example of a process for restricting a determined unknown application with respect to a given organization in accordance with some embodiments.

FIG. 10 is a flow diagram showing an example of a process for restricting a determined unknown application with respect to a given organization in accordance with some embodiments. In some embodiments, process 1000 may be implemented at application identification server 114 of system 100 of FIG. 1.

Process 1000 describes an example process of programmatically restricting a determined unknown application with respect to a given organization. In some embodiments, an instance of process 1000 can be performed for each unknown application that was determined for the given organization.

At 1002, analysis results associated with an unknown application that was determined for an organization are presented at a user interface. In some embodiments, the analysis results are determined using a process such as process 900 of FIG. 9. For example, the analysis results are presented at a user interface that is presented to a security team user of the organization for which the unknown application was determined.

At 1004, an input of a desired type of access associated with the unknown application with respect to the organization is prompted for at the user interface. The user interface can present interactive field(s)/element(s) that enable the security team user of the organization to input a desired level/type of access to be granted to the unknown application. The user interface can also be presented to a software purveyor user of the organization so that the software purveyor user can be made aware of the organization's usage of the application, approve or disapprove the application for the organization, and proceed with initiating an official organization-to-organization relationship with the vendor of the application.

At 1006, the input of the desired type of access is received.

At 1008, a policy associated with the unknown application is generated based on the input of the desired type of access. For example, the input of the desired type of access may describe one or more types of users and their desired/permitted accesses to one or more types of data that are stored by the unknown application. This input may then be translated into a policy that is then configured for the organization.

At 1010, an audit of the policy associated with the unknown application is performed to detect violation(s), if any. To perform an audit of the policy, for example, the actual accesses of the types of users specified by the policy to the stored data at the unknown application are compared against the desired/permitted accesses. Any discrepancies between the actual accesses and the desired/permitted accesses can be exposed to the security team user associated with the organization at the user interface.

At 1012, access(es) of one or more users associated with the organization to the unknown application are restricted. In some embodiments, accesses to the application can be restricted in accordance with stored security configurations of the organization. For example, the organization may have a default security configuration that forbids non-administrative users at the organization from having delete access to data stored at an application. Other example types of restrictions include blocking the IP address associated with the unknown application (if no access is desired for certain users) and/or disconnecting users from the unknown application.

At 1014, an organization-specific registry associated with the organization is updated based on the unknown application. After the organization has been made aware of and has implemented security measures (e.g., restrictions and/or a policy) for the unknown application, the application becomes a known application to the organization. As such, that organization's organization-specific registry can be updated to include a new entry that includes at least identifying information associated with the application as well as the last seen date of the application.

In some embodiments, fewer than all steps of process 1000 can be performed for an unknown application with respect to an organization. In some embodiments, steps other than or in addition to those of process 1000 can be performed for an unknown application. Other example steps that can be taken with respect to the unknown application may include one or more of the following: requesting information from the vendor of the unknown application, contacting the first user of the organization that has been determined to have used the unknown application, establishing a workflow for using the unknown application, obtaining contracts associated with using the unknown application, comparing the vendor of the unknown application against existing policies/contracts, augmenting the context in the unknown application to check whether the augmented contexts would cause a violation in the configured policy, checking the unknown application against a known whitelist, aggregating usage statistics of the unknown application, determining (e.g., aggregated) user access levels to the unknown application after restrictions have been implemented, identifying users that have granted the unknown application a broad scope of access, and comparing a user's actual access to the unknown application against their intended access as stored by an identified management system.

Various embodiments described herein allow applications that are used by some members of an organization but that are not formally purveyed by the organization to be detected by scanning recorded events. Then, once these applications that were once unknown to the organization are detected, ratings and historical incidents associated with the applications can be queried and the subsequent use of the applications can also be monitored to curb their risk to the organization.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
   a processor configured to:
   detect an event associated with accessing a discovered application from recorded events;
   determine target information associated with the event;
   identify the discovered application from the target information, wherein to identify the discovered application from the target information comprises to:
   determine a target IP address from the target information;
   connect to the target IP address using transport layer security (TLS) at a predetermined port;
   obtain a TLS certificate from a web server associated with the target IP address; and
   parse the TLS certificate to determine identity information associated with the discovered application corresponding to the target IP address;
   compare the identity information associated with the discovered application to an organization-specific registry, wherein the organization-specific registry comprises identifying information associated with one or more known applications relative to an organization and respective one or more dates at which one or more known applications were previously identified from previously determined target information for the organization;
   in response to a determination that the identity information associated with the discovered application does not match any entries in the organization-specific registry, determine that the discovered application is an unknown application relative to the organization; and
   in response to the determination that the discovered application is the unknown application:
   apply a security measure to the discovered application; and
   insert a new entry into the organization-specific registry with identifying information associated with the discovered application and a date at which the
   discovered application was identified from the target information; and
   a memory coupled to the processor and configured to provide the processor with instructions.

2. The system of claim 1, wherein the event associated with accessing the discovered application comprises a first event, and wherein a second event associated with accessing the discovered application is detected from one or more of the following: a host device associated with the organization and a network device associated with the organization.

3. The system of claim 2, wherein the event associated with accessing the discovered application is detected from one or more of the following: recorded firewall/proxy logs, content that is cached by a web browser, summaries of connections between different devices, and data cached by password managers.

4. The system of claim 1, wherein the target information associated with the event comprises one or more of the following: an outbound host name, an outbound domain name, an outbound internet protocol (IP) address, a web page fragment, a universal resource locator (URL), an email address, a user name, a company name, and an application name.

5. The system of claim 1, wherein to identify the discovered application from the target information further comprises to:
query a knowledge base using at least a portion of the target information, wherein the knowledge base stores mappings between applications and previously determined target information; and
determine an application name associated with the discovered application corresponding to the at least portion of the target information from a matching entry in the knowledge base.

6. The system of claim 1, wherein to identify the discovered application from the target information further comprises to:
query a search engine using at least a portion of the target information;
obtain a subset of search results corresponding to the query;
parse at least a portion of webpages associated with the subset of search results to determine appearance frequencies of application names; and
determine an application name associated with the discovered application corresponding to the at least portion of the target information based at least in part on the appearance frequencies of the application names.

7. The system of claim 1, wherein the processor is further configured to query one or more third party data sources for ratings and profile information associated with the discovered application.

8. The system of claim 1, wherein the processor is further configured to evaluate a set of access levels by the discovered application through a set of users of the organization.

9. The system of claim 1, wherein the processor is further configured to evaluate a set of access levels of a set of users associated with the organization to the discovered application.

10. The system of claim 1, wherein to apply the security measure comprises to restrict accesses of a user to the discovered application.

11. The system of claim 1, wherein to apply the security measure to the discovered application comprises to:
assign a policy to the discovered application; and
perform an audit of the policy on the discovered application including to:
determine actual configurations at the discovered application for one or more types of users that are described in the policy; and
compare the actual configurations to desired configurations that are described in the policy to determine whether any discrepancies exist.

12. The system of claim 1, wherein the processor is further configured to:
identify a set of users of the organization that are linked to the discovered application based at least in part on analyzing recorded events that associate the target information associated with the discovered application and identifying information associated with users, integrations between user accounts and the discovered application, and users' web metadata that include data associated with the discovered application; and
determine a number of users included in the identified set of users.

13. A method, comprising:
detecting an event associated with accessing a discovered application from recorded events;
determining target information associated with the event;
identifying the discovered application from the target information, wherein identifying the discovered application from the target information comprises:
determining a target IP address from the target information;
connecting to the target IP address using transport layer security (TLS) at a predetermined port;
obtaining a TLS certificate from a web server associated with the target IP address; and
parsing the TLS certificate to determine identity information associated with the discovered application corresponding to the target IP address;
comparing the identity information associated with the discovered application to an organization-specific registry, wherein the organization-specific registry comprises identifying information associated with one or more known applications relative to an organization and respective one or more dates at which one or more known applications were previously identified from previously determined target information for the organization;
in response to a determination that the identity information associated with the discovered application does not match any entries in the organization-specific registry, determining that the discovered application is an unknown application relative to the organization; and
in response to the determination that the discovered application is the unknown application:
applying a security measure to the discovered application; and
inserting a new entry into the organization-specific registry with identifying information associated with the discovered application and a date at which the discovered application was identified from the target information.

14. The method of claim 13, wherein the event associated with accessing the discovered application comprises a first event, and wherein a second event associated with accessing the discovered application is detected from one or more of the following: a host device associated with the organization, and a network device associated with the organization.

15. The method of claim 14, wherein the event associated with accessing the discovered application is detected from one or more of the following: recorded firewall/proxy logs, content that is cached by a web browser, summaries of connections between different devices, and data cached by password managers.

16. The method of claim 13, wherein the target information associated with the event comprises one or more of the following: an outbound host name, an outbound domain name, an outbound internet protocol (IP) address, a web page fragment, a universal resource locator (URL), an email address, a user name, a company name, and an application name.

17. The method of claim 13, wherein applying the security measure to the discovered application comprises:
assigning a policy to the discovered application; and
performing an audit of the policy on the discovered application including:
determining actual configurations at the discovered application for one or more types of users that are described in the policy; and comparing the actual configurations to desired configurations that are described in the policy to determine whether any discrepancies exist.

18. The method of claim 13, further comprising:
identifying a set of users of the organization that are linked to the discovered application based at least in part on analyzing recorded events that associate the target information associated with the discovered application and identifying information associated with users, integrations between user accounts and the discovered application, and users' web metadata that include data associated with the discovered application; and
determining a number of users included in the identified set of users.

19. A computer program product, the computer program product being embodied in a non-transitory computer readable storage medium and comprising computer instructions for:
   detecting an event associated with accessing a discovered application from recorded events;
   determining target information associated with the event;
   identifying the discovered application from the target information, wherein identifying the discovered application from the target information comprises:
      determining a target IP address from the target information;
      connecting to the target IP address using transport layer security (TLS) at a predetermined port;
      obtaining a TLS certificate from a web server associated with the target IP address; and
      parsing the TLS certificate to determine identity information associated with the discovered application corresponding to the target IP address;
   comparing the identity information associated with the discovered application to an organization-specific registry, wherein the organization-specific registry comprises identifying information associated with one or more known applications relative to an organization and respective one or more dates at which one or more known applications were previously identified from previously determined target information for the organization;
   in response to a determination that the identity information associated with the discovered application does not match any entries in the organization-specific registry, determining that the discovered application is an unknown application relative to the organization; and
   in response to the determination that the discovered application is the unknown application:
      applying a security measure to the discovered application; and
      inserting a new entry into the organization-specific registry with identifying information associated with the discovered application and a date at which the discovered application was identified from the target information.

* * * * *